US008717316B2

(12) United States Patent
Gothard

(10) Patent No.: US 8,717,316 B2
(45) Date of Patent: May 6, 2014

(54) INTERACTIVE MEDIA DISPLAY

(75) Inventor: David Gothard, Naples, FL (US)

(73) Assignee: Activelight, Inc., Naples, FL (US)

( * ) Notice: Subject to any disclaimer, the term of this patent is extended or adjusted under 35 U.S.C. 154(b) by 328 days.

(21) Appl. No.: 13/019,988

(22) Filed: Feb. 2, 2011

(65) Prior Publication Data

US 2011/0234514 A1  Sep. 29, 2011

Related U.S. Application Data

(60) Provisional application No. 61/300,655, filed on Feb. 2, 2010.

(51) Int. Cl.
*G06F 3/041* (2006.01)

(52) U.S. Cl.
USPC .......................................................... 345/173

(58) Field of Classification Search
USPC ............... 345/173; 461/30, 31; 715/700, 855; 705/43; 235/383
See application file for complete search history.

(56) References Cited

U.S. PATENT DOCUMENTS

| | | | |
|---|---|---|---|
| 4,179,723 A | 12/1979 | Spencer | |
| 4,359,631 A | 11/1982 | Lockwood et al. | |
| 4,817,043 A | 3/1989 | Brown | |
| 5,412,416 A | 5/1995 | Nemirofsky | |
| 5,557,721 A | 9/1996 | Fite et al. | |
| 5,949,411 A | 9/1999 | Doerr et al. | |
| 6,215,411 B1 | 4/2001 | Gothard | |
| 6,384,736 B1 | 5/2002 | Gothard | |
| 7,064,672 B2 | 6/2006 | Gothard | |
| 7,369,058 B2 | 5/2008 | Gothard | |
| 7,978,376 B2 * | 7/2011 | Divine et al. | 358/302 |
| 8,243,048 B2 * | 8/2012 | Kent et al. | 345/177 |
| 8,285,856 B1 * | 10/2012 | Jain et al. | 709/228 |
| 8,312,371 B2 * | 11/2012 | Ording | 715/700 |
| 8,330,613 B2 | 12/2012 | Gothard | |
| 2010/0117933 A1 | 5/2010 | Gothard | |
| 2013/0009968 A1 | 1/2013 | Gothard | |

FOREIGN PATENT DOCUMENTS

WO   2005048229 A2   5/2005

OTHER PUBLICATIONS

"Comming to a Video Store Near You", High Beam Research, PR Newswire, Oct. 7, 1998.

* cited by examiner

*Primary Examiner* — Abbas Abdulselam
(74) *Attorney, Agent, or Firm* — Patent Law Offices of Rick Martin, P.C.

(57) ABSTRACT

An interactive media display system comprising at least one digital display panel, at least one touch screen display panel and at least one processor for operating and controlling the display panels. The system preferably includes a media dispensing system which enables the interactive media display to create and/or dispense media related products.

19 Claims, 7 Drawing Sheets

INTERACTIVE MEDIA DISPLAY

This application claims the benefit of U.S. Provisional Patent Application No. 61/300,655, filed on Feb. 2, 2010 and entitled "Computer Operated Digital Display," the contents of which are incorporated herein by reference in their entirety.

BACKGROUND

The present invention relates in general to an interactive media display system with transactional capabilities. More particularly, the invention relates to a stand-alone, kiosk-type apparatus having the ability to simultaneously provide electronic display imagery, with or without sound, and enable electronic transactions, which may or may not pertain to the content of the electronic display imagery.

The electronic age has seen a multitude of advancements and innovations in the means of communications, including media or marketing communications. Whereas just a decade or so ago, one of the primary modes of advertisement was printed matter, whether in the form of hand held literature and brochures, newspapers, posters, billboards, and, subsequently, backlit panels; such modes of marketing and advertisement have been usurped by electronic displays: living billboards, if you will.

These electronic displays take the form of flat panel display systems and screens, most often LCD, LED and plasma displays. Plasma display screens, as well as other flat panel display screens, are complex electronic devices and quite fragile; necessitating intricate electronics, particularly as compared to printed media, specific protective measures in their placement and integration and, in particular, special care in the handling and placement of the same. In particular, great care has to be taken not to crack the screen because this would render the screen useless as a medium for a display. In addition, flat panel display screens are quite costly, rendering the value of the cost to protect them greater than the cost to replace them.

Other forms of electronic medium and apparatus that has seen a monumental increase in use and installations are the touch screen interactive systems. Most notably, these have found significant utility and application in the banking industry as ATMs and in the transportation industry as check-in kiosks in airports, train stations and other transportation centers. They have also found applicability in information kiosks, especially for providing directions in individual stores and in malls.

Despite the proliferation of both types of electronic mediums, the two have remained distinct for their particular markets and end-use applications. However, these technologies, in combination, have the potential to harness a huge, unforeseen need in the market for a stand alone system that serves as both a marketing and sales tool while concurrently providing transactional capabilities to complete the transaction contemplated or promoted by the marking and sales tool as well as transactions that may be totally unrelated to the message of the marketing and sales imagery presented.

SUMMARY OF THE INVENTION

The present invention relates to an interactive marketing and transactional system comprising at least one high-resolution, digital display system and at least one interactive, touch screen type transactional system. Both systems are preferably contained within stand-alone kiosk-type housing and, most preferably, are electronically interconnected, if not wholly integrated, so as to appear and operate as a single cohesive system. The system or, more aptly, the apparatus is generally comprised of a housing, particularly a kiosk-type housing, at least one wide-viewing angle digital display panel, at least one touch screen type display panel, at least one processor dedicated to the operation of the system, preferably, at least one processor dedicated to the at least one digital display and at least one processor dedicated to the at least one touch screen display, most preferably a separate processor for each touch screen display, and each of their respective peripheral devices, and one or more storage devices associated with the processor for the digital display and, optionally, though preferably, with each processor.

The digital display, more specifically its processor and the associated storage device, is generally configured to receive digital content directly, e.g., by use of a flash drive, domino, or stick; a CD/DVD drive; a disc drive; or the like, or, most preferably, is configured to accept media content from a local source, e.g., via hardwire (dedicated or not) or wirelessly from a local computer/data base in the same, adjacent or proximate facility or from a remote source through/over a communications link such as a satellite link, a telephonic or cable connection, or through/over the internet or a similar communications/information transport medium. In the latter, the information downloaded to the processor, and ultimately the digital display storage device, may originate at a remote location miles, if not hundreds of miles from the actual interactive system. Most preferably, the interactive system is principally controlled by a central control at a remote location, which may be the remote source, with the operations pertaining to the power on/power off, volume, lamination, etc. and, perhaps, locally specific content or marketing media, being controlled locally on a sub-administrative basis.

The interactive system is typically, though not necessarily, in the form of a kiosk-type unit, which may be a permanent-type structure, e.g., a dedicated wall space or unit or a built-in end-cap unit in, e.g., a retail store, especially a grocery store, or is most preferably a readily portable structure which may be moved from one location to another, within or without a given facility, with minimal manpower, perhaps one or two workmen using a dolly or similar hand cart. Simply disconnect the power and, if applicable any communications cables, wires, etc. and the apparatus is ready to move.

Most preferably, and advantageously, the interactive system incorporates elements, apparatus, and means by which digital and/or printed media is created within and/or dispensed from the interactive system. For example, the interactive system may dispense coupons, tickets, reservation confirmations and the like as well as digital media, including recorded songs, videos, movies, and the like. Specifically, the system is preferably configured to dispense prerecorded and/or preprinted media as well as to download and transfer such content to a user supplied media or storage device, i.e., a flash stick, domino, or drive; a DVD/CD disc; a floppy disc; or the like, or to blank print stock or digital storage media stored within the interactive system and subsequently dispensed by the interactive system.

In a preferred embodiment, the content of the digital display is coordinated with the touch screen displays to enable the viewer to take advantage of promotions, offers, surveys, sales, and the like that are the subject of or related to the subject of the digital imagery presented on the digital display. Alternatively, the touch screen displays may allow open interaction and intercommunication with any number of applications, whether commercially transactional or non-transactional. For example, the touch screen display may allow one to directly connect to the internet to shop and otherwise conduct commercial transactions; to search for directions and recommendations as to commercial, retail, hospitality, governmental, sporting and entertainment facilities and events; to look up local resources and the like.

The interactive system may be configured to possess and facilitate many different advantages and purposes which are made more clearly apparent from a consideration of the forms in which it may be embodied. Some of these forms are shown in the drawings which form a part of and accompany the present specification. They will now be described in detail for purposes of illustrating the general principles of the display system. However, it is to be understood that the following detailed description and the accompanying drawings are not to be taken in a limiting sense.

DETAILED DESCRIPTION

Figure 1:
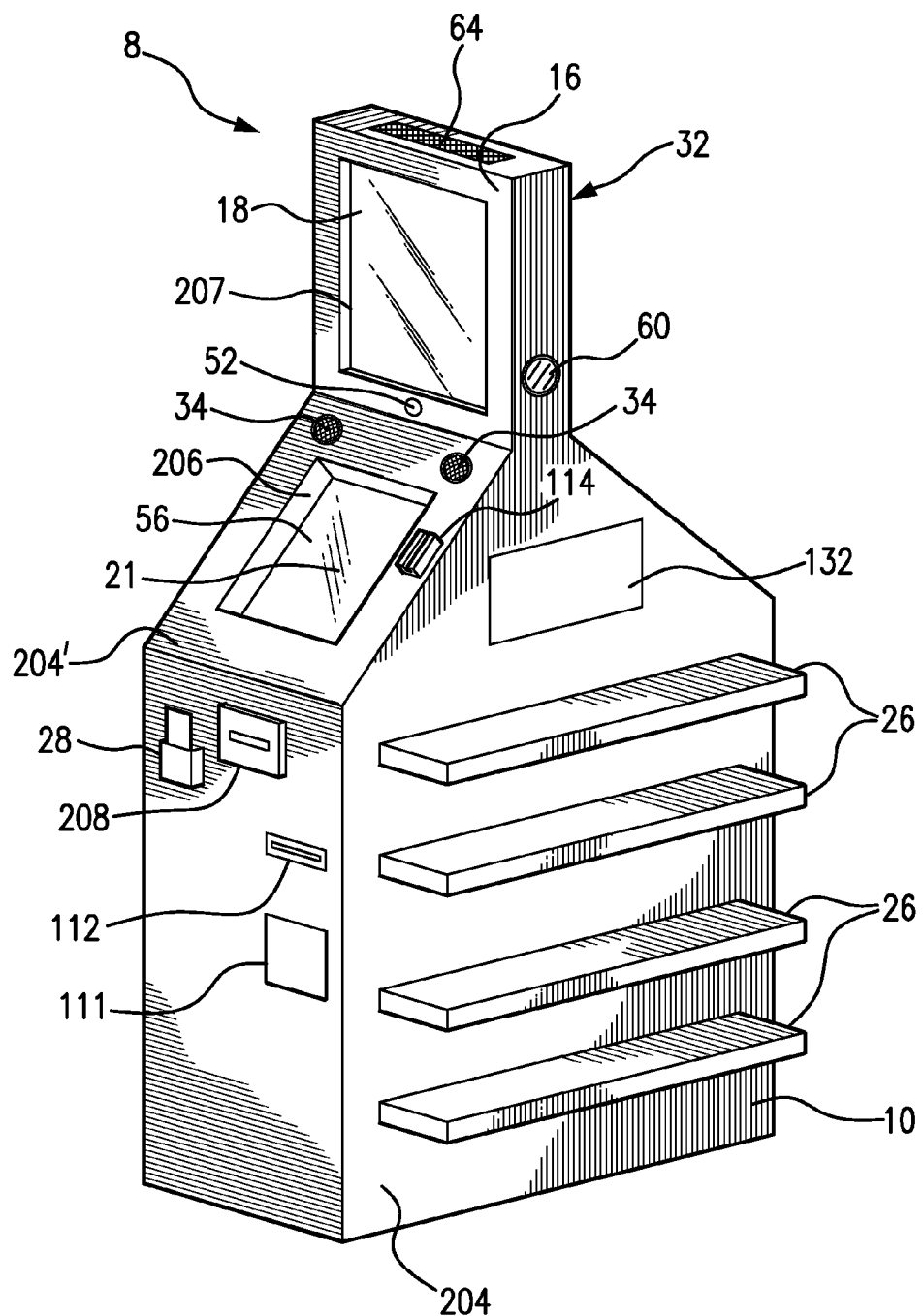
FIG. 1 is a perspective view of an exemplary, stand-alone interactive system in accordance with the present specification.

As used herein and in the appended claims the term "interactive system" means a system having both display and independent transactional capabilities and comprising at least one high-resolution, digital display (hereinafter the "digital display"), at least one interactive, touch screen type transactional display (hereinafter the "touch screen display"), and at least one processor, most notably a computer, such as a laptop or equivalent computer, associated with and operating the digital display and the touch screen display. Preferably, the interactive system comprises a plurality of processors, at least one processor dedicated to the operation of the digital display(s) and its peripheral components and at least one processor dedicated to the operation of the at least one interactive display and its peripheral components, most preferably, at least one processor for each interactive display. The processors are most preferably interconnected and/or integrated; though most often dedicated to a distinct display, e.g., a digital display or an interactive display. Each of these displays and their peripheral and other associated elements will be described in more detail below.

The interactive system may be built into a "permanent" or structural wall of a facility into which it is integrated, but is preferably contained within/built into a kiosk or kiosk-type housing. The kiosk or kiosk-type housing may be a permanent-type structure, e.g., a built-in end-cap unit in a retail store, especially a grocery store, or is most preferably a stand-alone, readily portable structure which may be moved from one location to another, within or without a given facility, with minimal manpower, one or two workmen, using a dolly or similar hand cart.

The first critical element of the interactive system is the at least one digital display. Digital displays are well known and widely available. Numerous types of digital displays are well known and widely available including, but not limited to, liquid crystal displays (LCDs), light emitting diode displays (LEDs), plasma displays, organic crystal displays, organic luminescent displays, backlit LCD displays, including those backlit by LEDs and other backlighting elements, and the like. The primary display screen is preferably of a sufficient brightness, resolution, size, and viewing angle in order to be viewed by a group of onlookers at a distance to the display system, most typically within five to twenty feet of the display. The primary display screen could have a brightness of from about 100 to about 800 NITS, preferably from about 400 to about 600 NITS, generally at least about 400 NITs. The primary display screen could have a size of at least 32 inches measured diagonally, preferably from about 36 to about 70 inches, most preferably from about 42 to about 65 inches. Of course, in part the size is limited by the current manufacturing technologies of the respective display. Larger size displays can be configured by combining multiple display panels into a single panel. The primary display screen could have a viewing angle in excess of 120 degrees, preferably at least 140 degrees, most preferably 160 degrees or more. These displays typically have at least 640 horizontal display pixels and at least 480 vertical pixels with native resolution of at least 640 by 480, though they preferably contain about 1920 horizontal display pixels and 1440 vertical display pixels, more preferably, about 1920 horizontal display pixels and 1080 vertical display pixels. Again, the limitations are only those of the display technology and as improved display technologies become available, it is expected that they too will be suitable for use in the interactive systems of the present invention. The digital displays may be situated in the kiosk housing and operated in a horizontal orientation or in a vertical orientation. The pixel dimensions given above refer to a horizontal orientation.

The digital display screen may be made with a slightly thickened peripheral edge so as to obtain a generally uniform display thickness. Though these display screens are up to four or five inches in thickness, newer technologies have emerged whereby the display screen are many orders of thickness less: having thicknesses of less than 50 mm, preferably of about 35 mm. It is to be appreciated that the digital display panel may be a touch screen display panel, as described below, meaning that it has one or more elements needed to perform as a touch screen display; however, its use and function as part of the interactive system is as a dedicated display panel and not as a touch screen display panel. Generally speaking, the digital display panel will not be enabled to perform the touch screen capabilities by the viewer as discussed below with respect to the touch screen displays.

As noted, suitable display screens are widely available from a number of major digital display screen producers including NEC Corporation, Fujitsu Ltd., and Toshiba Corporation. These and other display screens may effectively operate as high-definition direct-view television monitors.

The second critical element of the interactive system is the one or more touch screen displays. Touch screen displays are well known and widely available as well. Touch screen displays are typically constructed based on one of multiple technologies, including, but not limited to, 4-wire resistance, surface acoustic wave, 5-wire resistive, infrared, capacitive, optical imaging, and dispersive signal technology, most commonly resistive, wave and capacitance. Expressed in the simplest of terms, the touch screen display comprises a touch film/sheet/lamina which overlays or is affixed or adhered to or laminated to a display screen, including CRTs, but most especially digital display screens such as LCD and LED display screens. Though many of the features, operating characteristics and the like of the digital display screens of the touch screen displays are the same or similar to those of the aforementioned digital displays, it will be appreciated that these will typically be smaller in size, more on the order of a typical computer monitor screen or computer notebook screen, e.g., from about 27 inches or less, preferably 24 inches or less, more typically from about 10 to about 18 inches. Associated with the touch screen display is the touch screen controller which processes the electrical impulses and other signals generated by the touch on the touch screen display. While the touch screen controller is a separate element and/or could be integrated into the processor for the touch screen display, as discussed below, for convenience, it is to be understood that reference in the text and accompanying drawings and claims to the touch screen display includes, as an integrated component thereof, the controller. Thus, the touch screen controller will not henceforth be called out by name unless specifically warranted.

Each of the aforementioned touch screen technologies and their respective devices are well known and firmly established in commercial use and are widely available. Thus, it is believed that further discussion in relation to these technologies and various constructions is not necessary, particularly in the interest of simplifying and keeping reasonably short and concise the present specification. Sources of suitable touch screen displays include Mass Multimedia, Inc., EDL International, Co., Ltd., Frametech, Inc., Beacon Extenders, Inc., Palm Technology Co., Ltd., and Groovy Technology Corp., among a host of others. Furthermore, though the touch screens incorporate a digital display screen, reference herein to digital display means the primary digital display discussed above, and unless otherwise specifically mentioned as such, does not refer to the touch screen display.

The third critical element of the interactive system of the present invention is the processor, preferably the processors, which controls the operation of the interactive system, as a whole, and, individually, the operative components thereof. The specific design, construction, and operational capabilities of the processor will depend upon whether the processor is a single processor operating the whole of the interactive system, a processor dedicated to one or more digital displays, a processor dedicated to one or more touch screen displays, or both. In its simplest form, the processor may take the form of a video card with video translator circuitry and appropriate input-output signals, with or without its own memory, which passes and translates digital signals from a remote source to the digital display for presentation of the content embedded in the digital signals. However, such a device would only function for the digital display and would not be sufficient and/or commercially viable for the touch screen display. Preferably, the processor of the interactive system comprises a central processing unit and motherboard, with or without daughter boards, situated within or proximate to the housing for the interactive system. Specifically, if the interactive system is built into a wall of a facility, the processor may be in the wall or on a shelf adjacent or proximate to the wall (most often on the opposite side of the wall from the digital display screen itself, but in any event is within about 10 feet, preferably within about 5 feet or less of the digital display and touch screen display: though select set-ups, especially where multiple digital displays and touch screen displays are dispersed in a facility yet run off the same processor, the processor may be 100 feet or more from furthest display set. Preferably, though, the processor is within the structure, preferably a kiosk or kiosk-type structure, holding or having integrated or built therein the at least one digital display and the at least one touch screen display.

While the processor may comprise the minimal electronic elements for controlling and operating a digital display and a touch screen display, e.g., a mother board and associated elements, all as is well understood and appreciated by those skilled in the art, preferably, the processor comprises a computer. As used herein a computer comprises those elements, including a mother board, RAM, communication ports, video cards, sound cards, and the like, typical of a laptop computer, simple, complicated or in-between, so long as it is capable of performing the desired functions of the interactive system. Other components which may be and are typically present include daughter boards, wireless cards, power supplies, memory, and the like. In the case of those interactive systems where one or more dedicated processors control the digital display and one or more dedicated processors control the touch screen displays, it will be appreciated by those skilled in the art that each will have the necessary components and capability to drive or operate their respective displays and associated functions, all as noted herein. For example, while sound capability would be important for the digital display, sound is not as important, and may even be an option, for the touch screen display. Most often sound for a touch screen is merely a tone which indicates that a touch command has been noted: however, this indicator functionality could also be accomplished by a highlighting of the touch element/indicator.

As noted, preferably the interactive system comprises two or more processors: at least one dedicated to the operation and control of the digital display(s) and at least one dedicated to the operation and control of the touch screen display(s). More preferably, each display screen, whether digital or touch screen will have a dedicated processor so as to ensure that issues with one processor will not affect any other display. Additionally, it is most preferable to have a dedicated processor for each touch screen display, even if a single processor is associated with multiple digital displays, so that processing on one touch screen does not hamper, slow down or otherwise impact upon a concurrent processing on another touch screen display. Where multiple processors are employed, the processors will be interconnected with one another or will be connected through a common hub, router or modem. This enables coordination between the digital displays and the touch screen displays, a factor that may be especially important and beneficial where the content being displayed on the digital display is related to the transactions to be performed on or conducted using/through the touch screen displays. Conversely, the processor associated with the touch screen display may be able to direct and/or override, on a temporary basis, the display to be or being presented on the digital display so as to show a display associated with a search or inquiry placed on the touch screen display. For example, the touch screen display and processor may have certain menus from which a user could choose a display to be presented on the digital display or it may have a search engine which allows for one to search and download content from a remote source, select websites and/or the Internet.

The processor for the digital display will typically have associated with it or incorporate a memory, in addition to RAM memory, which stores the media content to be displayed and, preferably, annunciated on the digital display. Specifically, the memory will store the promotional campaigns, informational campaigns, etc. to be displayed on the digital display as well as the instructions/commands pertaining to their presentation, i.e., sequencing, repetition, etc. Such content may be directly downloaded to the digital display processor and associated memory from any number of portable memory devices, e.g., a flash drive, CD/DVD, tape, or other electronic/digital media transfer device. Alternatively, the digital display media may be downloaded from a local source, i.e., a source located within the same building, facility or campus, to the interactive system via a direct and/or dedicated communications link; over telephone lines; via cable; or via local wireless communications. In this manner a specific campaign or promotion can be presented to the target audience over a limited geographic area, e.g., within a mall, community, campus, etc.

Most preferably, the content, or at least a portion thereof, is sourced from a remote source via a direct and/or dedicated communications link; over telephone lines; via cable; via wireless communications, including satellite, microwave, and the like; over or through the internet; etc. In this way, regional and national campaigns can be coordinated amongst a plurality of interactive systems spread across a large geographical area, optionally, in combination with local campaigns. Here, a remote control source has operational or at least partial operational control over the interactive system, providing and commanding the content to be displayed, the timing and sequencing thereof, etc. Optionally, as mentioned above, these displays may also allow for local input so that a given store, facility, municipality, etc., may load content of local interest for the specific local audience. For example, a national or regional supermarket may coordinate national and/or regional promotions, while also allowing a local member store to promote a store only special.

Digital display systems of this type, i.e., a digital display and associated processor, are becoming more and more common and are commercially available from a number of sources including Activision TV, Inc. of Naples, Fla. These digital display systems, including their processors and peripheral elements, such as memory, CD/DVD rom drives, USB ports, modems, wireless communications ports/cards, video cards, and the like are well known and, as noted, commercially available. They are also described in greater detail in, e.g., U.S. Pat. No. 6,214,411; U.S. Pat. No. 6,384,736; U.S. Pat. No. 7,369,058; and U.S. Pat. No. 7,064,672 and in Published US Patent Application Nos. US 20101039208 A1 and US 201010117933 A1 all of which are hereby incorporated herein by reference in their entirety.

The processor for the touch screen display is likewise preferably a computer, most typically a menu driven computer, though it may also have free search capabilities, e.g., internet search capabilities. Like the computer for the digital display, it too will typically comprise many, if not all, of the same elements of the processor for the digital display; though whereas a processor that simply connects the display to a remote source for the actual content, e.g., a video card connection, is not practical for the touch screen display because of the time lag/delay in the sending and receiving of any data, signals, or commands. Thus, the touch screen display processor will be a computer having computer and interactive capabilities, most especially it will also coordinate the proper display or touch screen menu on the touch screen display in accordance with/in response to the touch responses/queries. Like the processor for the digital display, the touch screen display processor will be located in or proximate to the housing or placement of the touch screen display, most preferably within the housing into which the touch screen display is integrated or onto which it is affixed.

Touch screen systems comprising the touch screen display and processor are widely available commercially, as noted above. Furthermore, their construction details and additional elements are also well known, such apparatus now performing a number of service related functions including as ATMs, airport and other transportation terminal check in and ticketing kiosks, movie ticket kiosks, etc.

Although the foregoing discussion has focused on the physical elements of the processors, it is to be appreciated that each processor also has certain programs (including firmware), algorithms, and software, collectively "programs", embedded, associated with, or downloaded thereto. These programs are largely responsible for the overall functional operation of the displays, their elements and the presentation of content, as well as the conducting of any transactions, searches, and other interactive efforts undertaken with the same. Such programs are widely available and are basic core elements of any operable processor, especially computer. Programs specific to the tasks of each processor and its respective display are likewise well known and commercially available. While each program may be customized to meet the specific needs or desires of the interactive system, such customization is also well known and within the skill of one of ordinary skill in the art. Likewise, the same holds true for the interconnection or networking of the individual processors and the cross ability of one processor to influence or direct the operation of another. Given the myriad of applications to which the interactive systems of the present invention may be applied, it is nonsensical to attempt to present the algorithms and associated flow charts with each possible application associated with each, especially since these are currently available and readily produced and/or customized.

The interactive system will generally have a control panel associated with it, which may be on or integrated into the housing wall or within the housing itself. Preferably, a secure panel may overlie the control panel or provide access to the control panel so as to prevent unauthorized access. The control panel includes control switches for local operation of the digital display system which may be in the form of push button switches although other types of control switches could be used. The control switches may include for example, channel selection switches as well as off-on switches, volume controls, brightness controls, and the like. Alternatively, the interactive system could be configured with an administrative capability of the touch screen display whereby the touch screen display serves as the control panel or provides many of the functions of the control panel. In addition, and for users who prefer a degree of sophistication, other controls for controlling the operation of the various components of the interactive system, including the computer or for that matter the memory, may also be made available. In addition, it is to be appreciated that there could be a plurality of control panels for a given interactive system, though this would seem less optimal.

As noted above, each processor or computer may be dedicated and self-contained, i.e., a stand-alone device fully capable of operating those devices or components associated with the display system or, preferably, that digital display or touch screen display to which it is directly connected. The processor or computer will typically also function to operate any peripheral components which may be connected to the given digital display or touch screen display.

Preferably, the processor(s) are operated in conjunction with some receiver for receiving signals from a remote source. Usually, the receiver is a wireless receiver so that signals are sent by wireless communication. Examples of such wireless communication signals are broadcast signals, signals bounced from satellite dishes and the like and standard computer networking wireless signals, such as 802.11g type signals. However, the interactive system also contemplates the use of a receiver which is effectively hardwired to the remote source for directly delivering signals to the processor. To this extent, the signals which are transmitted from this remote source are hereinafter referred to as "electronic signals". Moreover, and although the signals could be transmitted in analog format, and ultimately converted to digital format, the signals are most preferably transmitted in the digital format to the extent possible. To the extent necessary, a modem or other signal processing device may be employed to translate the electronic signals to those signals usable by the processor.

The interactive system is a power operated system; hence, the system includes a main power supply which is connected to a power source. The main power supply may be a primary hub which then provides power to a plurality of secondary power supplies which, in turn, are connected to the various electronic/electric powered elements and peripheral elements and components of the interactive system or it may supply power to those elements and peripheral elements directly, or both. Preferably, the interactive system employs a primary hub power supply and a plurality of secondary power supplies so that issues with one or more components or secondary power supplies of the interactive system will not affect the operation of others.

Preferably, and advantageously, the interactive system incorporates elements, apparatus, and means by which digital and/or printed media is created and/or dispensed. For example, the interactive system may dispense coupons, tickets, reservation confirmations and the like as well as digital media, including recorded songs, videos, movies, and the like, in response to an interactive transactional session between a user and the touch screen display system. In this regard, the interactive system is configured to dispense pre-recorded and/or preprinted media stored and dispensed internally and/or to download such content to a user supplied storage device, i.e., a flash stick, domino, or drive; a DVD/CD disc; a floppy disc; or the like. It is understood that the concept of the media being stored and dispensed internally refers to that embodiment wherein the interactive display is or is contained within a kiosk or kiosk-type housing. Of course, as noted, the interactive system may be built into a wall of a facility in which case the accessory elements necessary to allow for the downloading to a user supplied media or to internally stored media means that these elements are likewise built into the wall adjacent or proximate to the digital display and processor.

In one embodiment the interactive system may incorporate a laser, inkjet or like printer which will print out literature, tickets, reservations, bill or sale, shipping labels and/or confirmations and the like relative to the transaction completed using the touch screen display. These printers may be associated with one or more storage receptacles for the print medium, e.g., paper stock, ticket stock, etc. The system may also be configured to have multiple storage receptacles to accommodate different print media, including tickets and paper stock. Alternatively, the printer may have a slot where the user inserts the appropriate print stock media that they have brought or which is supplied in an adjacent or proximate storage bin, shelf or the like.

Most preferably the interactive system has digital download capabilities which allows the user to download the desired information, video, music, etc. to a digital capable medium which, again, may be supplied by the user or stored and dispensed by the interactive system itself. For example the apparatus may have USB jacks to download data to flash drives, memory cubes, and other storage media. Alternatively, or in addition thereto, the interactive system may have a floppy disc drive, a CD/DVD writer or reader/writer, and the like. These components may be set so that the user can connect or insert their own media, which may be purely a storage device, as noted previously, or it may be an interactive device having digital data storage such as an MP3 player, iPod, cell phone, Blackberry, iPhone, etc. Similarly, the interactive system may also have a supply of blank storage media which are moved from the supply to a writer, download port, or the like (depending upon the selected storage media), where the desired content is downloaded to the bland media and then the loaded media dispensed to the user. New emerging technology contemplates the wireless download of data to storage media and such capabilities are also within the scope of the present application.

While the foregoing has been presented in terms of downloading and/or printing content to stock material or select media, it is also to be understood that the present invention also applied to interactive systems where the media to be dispensed is fully or partially preprinted or recorded, i.e., in the case of digital or electronic media, the content is already present on the media and the interactive system merely dispenses the selected device or media with the desired content. For example, an interactive system according to the present invention could have an inventory or one or more prerecorded CDs, DVDs, video cassettes, flash drives (especially the newer domino flash drives, such as those available from iriver), etc.

For convenience and to expedite transactions requiring payment and/or identification, the interactive system will preferably also incorporate a card reader or swipe which is capable of reading the magnetic strip on one's credit, debit or identification cards. This is especially useful in those systems in which payment is required. These apparatus not only enable payments to be made but also will allow those systems whose programming so allows, to automatically populate the fields of the data inquiry screens with such information as the identity of the user, their address and contact information and the like. Thus, this can enable expedited transactions: allowing users to quickly use the interactive system and more on to open it up to others.

In a preferred embodiment, the content presented on the digital display is coordinated with the transactional capability of the one or more touch screen displays to enable the viewer to take advantage of promotions, offers, surveys, sales, and the like that are the subject of or related to the subject of the content or digital imagery presented on the digital display. Alternatively, or in addition thereto, the touch screen display may allow open interaction and intercommunication with any number of applications and resources, whether commercial or non-commercial transactions. For example, the touch screen display may allow one to directly connect to the internet, to search for directions and recommendations, to look up local resources and the like. In general, the interactive systems of the present invention have a myriad of applications and benefits as compared to traditional interactive systems. Though not intended to be exhaustive, the following examples give a sense of the capabilities and excellent attributes of the interactive systems.

One application for the interactive systems of the present invention is in a movie theater, more especially in a multi screen theater or multiplex, as they are commonly referred to, most especially one that is a member of a large chain of movie theaters. The system could be set up at each location with multiple touch screen displays, with the digital display presenting highlights of currently offered movies or previews of coming attractions. The chain central command, at its remote location, can present and download to the processor of the digital screens the trailers, previews, etc. as well as the sequencing thereof, so that all digital displays company wide are done with a single set of instructions. Concurrently, the traders of the current shown movies will be stored in the memory of the digital display. A user of the touch screen display, uncertain of which movie they want to see could call up from a menu on the touch screen display the trailers or previews of the movies under consideration which are then shown, in an override mode, on the digital display. The moviegoer, once a decision is made, can complete the ticket purchase right on the touch screen display. In those theaters which accommodate such luxuries, the screen could also have a layout of the seating of the theater which shows the individual what seats are available for each showing; thereby enabling the user to select their movie and seat and pay for and print the ticket right there and then. Still further a submenu on the touch screen display could allow the moviegoer the option of pre-ordering and prepaying for their goodies, such as popcorn, candies and drinks; printing a receipt of their transaction and allowing the patron to quickly pick up their preordered and prepaid items on the way into the theater.

Another application for the interactive system is as a travel info center or directional tourist kiosk. In a zoo, the digital display could present an overview of the zoo and its attractions while the touch screen display could be used to locate specific attractions, give information and timing for select attractions, allow one to purchase or reserve a seat at specific attractions and the like while printing and dispensing a ticket or confirmation of the reservation. Similarly, a municipality may have a tourist kiosk which presents information pertaining to its local area with the touch screen allowing one to pull up onto the digital display specific details or an overview of a certain attraction. Alternatively, or in addition thereto, the touch screen display may have menus for such things as hotels, B&Bs, restaurants, and the like, optionally, with a short promotional video on each which is presented on the digital display, so that one may select the destination of choice, make a reservation and print out the confirmation of the reservation at the given hotel, restaurant, etc. Alternatively or in addition thereto, the interactive system may print out directions to the desired location, hotel, restaurant, etc.

In a governmental agency, such as a department of motor vehicles, a plurality of kiosks could be set up, each configured for a different purpose, e.g., driver's licenses, renewals, auto registrations, and the like. The digital display could provide an overview of the process and requirements for each, thus avoiding the need for long lines to ask simple question. Each touch screen display could also be configured to assist the user with the process of that station in the DMV. For example, if one is seeking to register a new car, one could merely choose the appropriate electronic form, swipe one's driver's license or credit card and allow the interactive system to populate the required fields based on the information obtained by the swiping of the card, use the touch screen to complete the remaining fields and then print out the form when completed and take it to a live person to complete the transaction or the system could be configured to allow the user to complete the transaction right at the kiosk. The kiosk could be further configured to print and dispense the vehicle registration as well as dispense the pre-formed license plate and, if appropriate, plate expiration sticker.

A particularly beneficial application is that of retail transactions. Here, the digital display could promote a particular good or service with the touch screen display enabling the user to seek further information, purchase the same, download and dispense coupons and the like. While shelf-located coupon dispensers already exist, there is nothing to prompt or induce the consumer to take the coupon and purchase the product. However, the present system allows the manufacturer, retailer, etc. to present a commercial or infomercial motivating the viewer to want to buy the product. Furthermore, rather than merely dispensing a coupon, the present interactive system can be configured to present a short survey to the consumer on the touch screen display thereby enabling the manufacturer, retailer, etc. to obtain real time demographics of its customer. An alternate iteration of the retail interactive system is that wherein the interactive systems replaces and serves the function of traditional catalog order sales in a retail outlet, allowing visuals of the desired product as well as the ability to order and have shipped the product directly to the user or to a third party.

Yet another application is in the music retail industry where a given kiosk could present music videos of a given artist while the touch screen system allows individuals to download the songs and/or music videos directly to their personal electronic devices or to a storage media which is dispensed by the kiosk.

Others, having the benefit of the present teachings and descriptions, will readily recognize and appreciate a host of other applications which would directly benefit from the present interactive system as well as other iterations thereof to suit specific needs or desires. Accordingly, having discussed the interactive system and its critical components generally, attention is now directed to the attached drawings which reflect various embodiments and aspects of the present invention. It is to be understood that these figures are neither all inclusive nor limiting. Furthermore, it is to be appreciated that elements depicted are representative only of the embodiment shown and not an indication that such elements are required. Indeed, those skilled in the art will readily appreciate that some of the elements called out in these drawings are optional, though perhaps, preferred. In following, it is also to be understood that not all of the electrical and communicative circuitry is shown; rather, the focus has been on those connections most key and/or critical to the invention. Still, those skilled in the art will readily appreciate what additional connections and/or alternative connections/configurations are possible while still functioning as intended. All such embodiments and alternative configurations are deemed within the scope of the present teaching.

Figure 4:
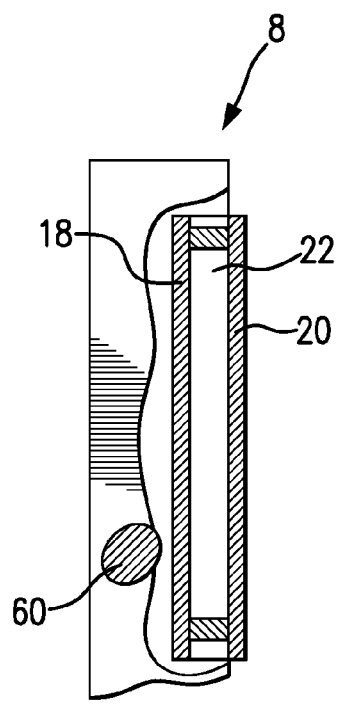
FIG. 4 is a side elevation view of the top portion of the digital display sub-housing interactive system of FIG. 1 partially broken away and in section.

FIG. 1 depicts one embodiment of a stand-alone kiosk type interactive system 8 generally comprising a housing 10 comprising front, back and side panels 204 and, extending from its upper surface, a digital display sub-housing 16. Situated within an opening 207 in the front face of the digital display sub-housing is a digital display 18. The digital display is preferably a plasma display or an LCD display, especially a backlit LCD display, and is most preferably set behind a protective sheet or film, as more clearly depicted in FIG. 4. Specifically, FIG. 4 presents a plan side, partially cut away view of the digital display sub-housing showing the digital display 18 set behind a protective film or sheet 20. The protective film or sheet is preferably glass or a relatively rigid, highly durable, transparent sheet formed of a durable, relatively scratch-resistant plastic material, most preferably polycarbonate or an acrylic, especially Lexan® polycarbonate. As depicted, there is preferably a small airspace 22 between the digital display 18 and the protective panel 20. Air inlets (not shown) allow the flow of air, initiated by the fans 60, to pass through the airspace 22, thereby drawing heat away from the digital display 18. Nevertheless, it is also contemplated that the protective sheet 20 could be immediately adjacent or affixed to the digital display 18 such that it is presented as a unitary component.

The interactive system 8 of FIG. 1 also includes either a second digital display or a fixed media display 32, on the backside of the digital display sub-housing so that viewers on both sides of the interactive system are exposed to advertising or like content. Where two digital displays are employed, each display could present the same media content or promotion or different content or promotions. Where the media is a fixed media display or advertising it is physically attached to the backside of the digital display sub-housing. Examples of fixed media displays include scrolling displays and single advertising posters. Unlike the digital display screens, the fixed media display can be set up to be easily updated locally. For example, the fixed media display may be a chalkboard-like surface like those used to promote daily meal specials in establishments, such as a restaurant, deli or supermarket. They can also be artistically updated to reflect periodic changes, such as daily meal specials. One or more additional fixed media displays 132 may also be affixed or located on other portions of the housing 10.

In the embodiment shown in FIG. 1, the touch screen display 56 is situated on an upper front panel or wall 204' of the housing 10 in or behind opening 206. Although not shown, this interactive system may also include a second touch screen display on the opposing upper back wall of the housing. Like the digital display 18, the touch screen displays also have a protective sheet 21 overlaying the face thereof; though the airspace, if any, will be small. Once again, the protective sheet may be glass or made of a durable, preferably scratch resistant, transparent plastic such as polycarbonate or acrylic.

Owing to the number of electronic components and the amount of heat typically generated by LCDs and plasma display screens, as well as the general heat sensitivity of the processors, the housing will also include a plurality of air inlets and fans 60 and one or more exhaust ports 64. The intake and circulation of cooler air with the concurrent exhaustion of warm air will help maintain a proper operating temperature for the interactive system. Although only shown in the digital display sub-housing, it is to be appreciated that other air inlets and fans could be placed most anywhere on the housing 10, particularly in the mid-section or lower regions of the housing. Furthermore, although the use of the air inlets and fans and air exhausts for air convection cooling may be employed and has been found to be suitable for controlling the environment, it is also possible to use other environmental control systems. A heating system could be employed if needed, such as for cold weather outdoor use. Similarly, an air conditioning system could also be used in certain circumstances. For this purpose, any suitable environmental control system can be employed as long as it keeps the internal components of the display system within their individual operating temperature and/or humidity bounds.

The interactive system 8 of FIG. 1 also has a number of associated elements for improving the overall utility and function of the system. For example, as indicated upper front wall element 204' also includes a pair of speakers 34 just above and to each side of the touch screen display which speakers produce sound correlating to the display on the digital display 18 or may provide for sound relative to the transaction occurring on the touch screen display 56. Alternatively, there may be a plurality of speakers, one or more dedicated to the digital display and one or more dedicated to the touch screen display. However, in order to avoid voice over interference, it is preferred that if speakers are associated with the touch screen display, they be such as to merely present tones or signals indicative of a successful touch action on the screen or to indicate when printing or dispensing is completed.

The housing 10 of the interactive system of FIG. 1 also includes a number of peripheral elements as well as openings for accessing other accessories or associated components or elements for the full use and function of the system. For example, mounted on or integrated into the housing may be one or more input devices 114, including, but not limited to, a credit card or other identification card reader, an optical disk drive, a barcode reader, or an RFID reader. The presence of an input device 114, especially a credit card reader, enables one to readily enter personal and commercial information to hasten and facilitate commercial transactions. This is especially so for transactions in which payment is to be made via a credit or debit card or a gift card. Optical scanners and bar code readers can facilitate similar transactions which are to be completed using downloaded and printed gift certificates, which are bar code dependent.

Additional peripheral elements include a holder or pocket 28, optionally having a cover door to protect the contents thereof from the elements, The holder is preferably for pre-printed pamphlets, mailer cards, and the like, but could also hold stock materials and blank media storage devices for insertion into a printer or recording device. Also included is a printing device 112, such as a thermal, laser or ink jet printer, for printing and issuing tickets, coupons, receipts, reservation confirmations, promotional advertisements, transactional confirmations, and the like. Alternatively, or in addition thereto, there may be a media dispenser 111 for dispensing products preprinted materials, prerecorded and newly recorded media and the like, all as further explained above and below.

The housing may, and preferably does, have one or more accessory openings 208, with or without doors. The accessory openings 208 may be of any size capable of allowing appropriate access to one or more accessory components located inside the housing. For example, the accessory opening may provide access to jacks, connector plugs, USB ports and the like to enable one to input data to the memory of the interactive system and/or to download electronic media or content from the system, most notably to one's own personal electronic device, e.g., MP3 player, iPod, iPhone, cell phone, etc. Alternatively, or in addition thereto, the accessory opening may provide access to other recording devices such as a CD/DVD writer, disc drive, or the like: again to enable one to insert the appropriate medium and download or record the desired data, information, content, etc.

The interactive system may also include a digital camera which is able to take pictures of the individual operating the touch screen display. The camera is connected to or associated with a digital storage for recording the images from the camera. This feature is important for those interactive systems involved in high value transactions to protect against fraud and unauthorized transactions. The digital camera could also allow for live chat with, e.g., a representative of the product or service being promoted or of another product service being called up by the operator of the touch screen display.

Finally, affixed to one or both side walls 204 of the housing 10 are a plurality of shelves 26 which may be used to display products, literature and the like and/or to serve as a supply of products to be purchased by a consumer. For example, when the interactive system 8 is employed as a stand-alone or end-cap display promoting a given product, the shelves will contain the product being promoted for ease of access and taking away by the consumer.

The interactive display shown in FIG. 1 is intended as more of a permanent structure and is directly hard-wired to electrical service (not shown). However, it could also be used as a moveable, portable structure having a power cord running from an internal power supply/power strip to a power outlet/power source at its intended installation site. To move the unit, it is simply unplugged and any communication wires or cables disconnected and the unit moved.

Figure 2:
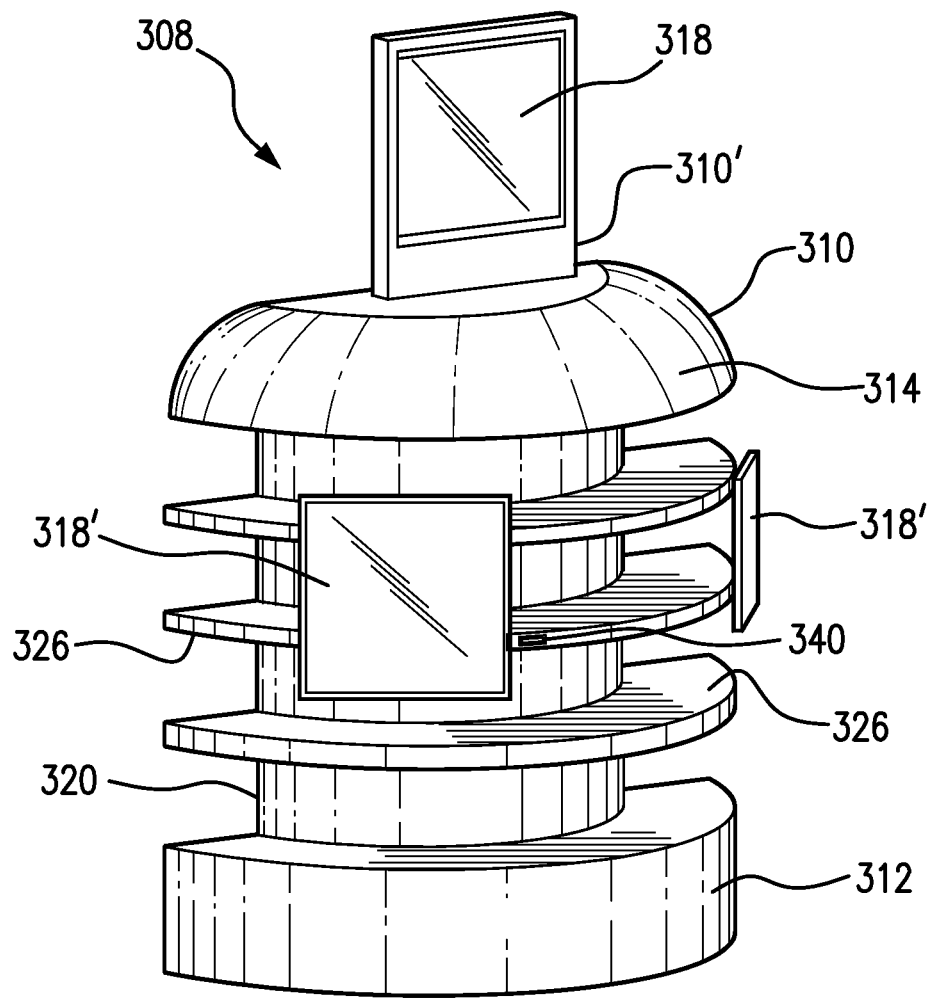
FIG. 2 is a perspective view of a second exemplary, stand-alone interactive system in accordance with the present specification.
Figure 3:
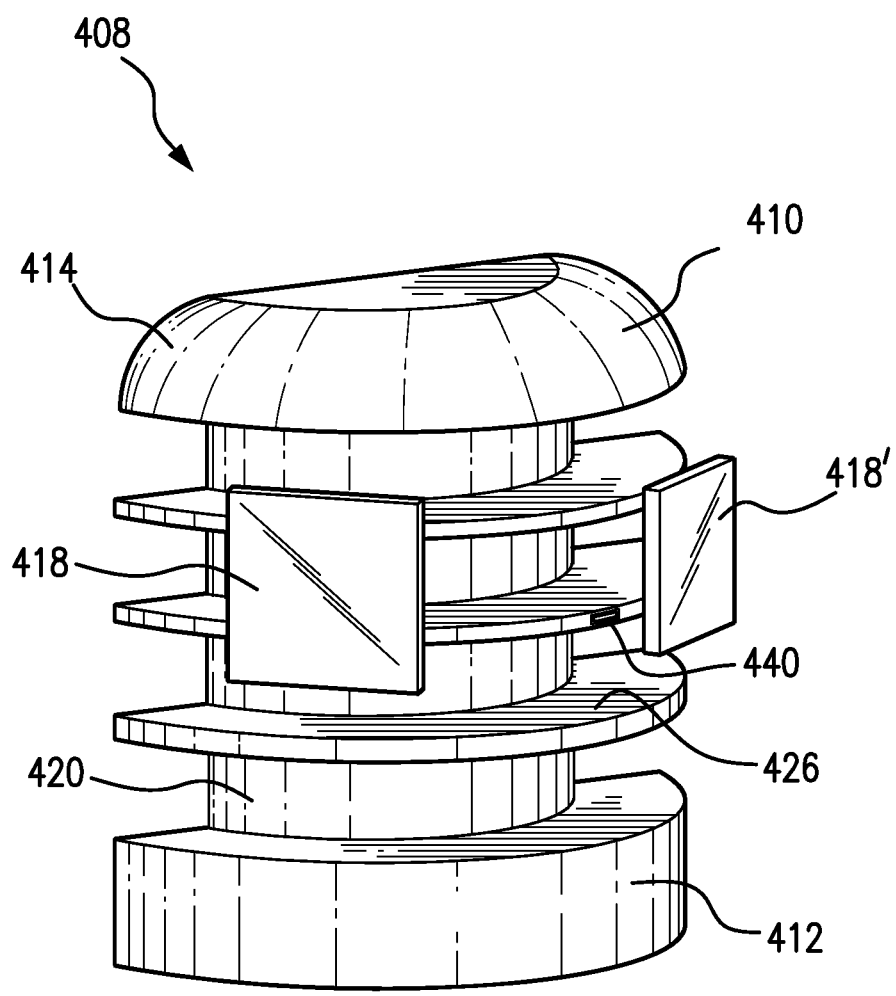
FIG. 3 is a perspective view of a third exemplary, stand-alone interactive system in accordance with the present specification.

FIGS. 2 and 3 present alternate designs 308 and 408 for the interactive system and are especially suited for use as product promotional kiosks. As seen these designs, like that of FIG. 1, have cylindrical shaped housings 310, 410 with a cylindrical pedestal 312,412, cylindrical core body 320.420 whose diameter is less than that of the pedestal, a domed cap 314,414 and a plurality of shelves 326,426. The interactive system of FIG. 2, like that of FIG. 1, has a digital display sub-housing 310' extending upward from the main housing and containing the digital display 318. Arranged about the circumference of the housing and affixed to the outer perimeter of the shelves 326 are a plurality of touch screen displays 318'. In contrast, the interactive system 408 of FIG. 3 has both the digital display and the touch screen display placed about the circumference of the housing and affixed to the outer perimeter of the shelving: otherwise, the two are the same. Adjacent each touch screen display and integrated into the shelf is a printer/dispenser 340,440 for dispensing coupons and/or informational materials pertaining to the products being promoted on the digital displays. The shelves contain the promoted product for ease of access and taking by the consumer.

Figure 5:
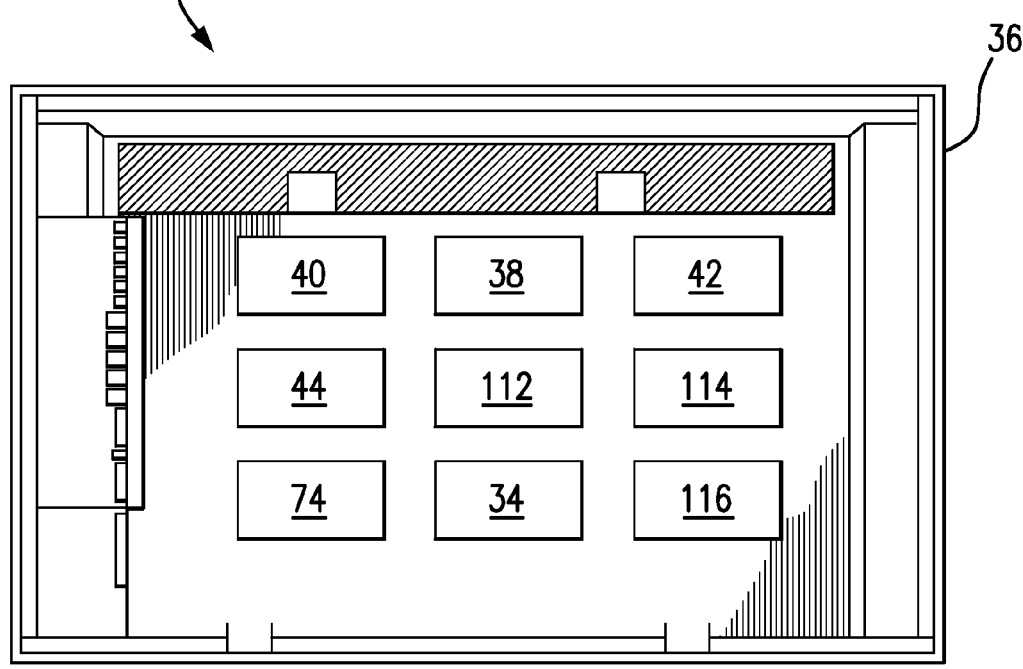
FIG. 5 is a schematic view showing some auxiliary components integrated into or associated with the digital display of an interactive system.

FIG. 5 presents a schematic 48 of some of the operative elements or components contained within the housing 36 of the interactive system. As shown, the system includes a main power supply 40 which feeds power directly to some of the components as well as to a secondary power supply 42, which in turn, feeds power to other components. This embodiment includes one or more processors, preferably two, 38: one for the digital display and the other for the touch screen display. Sound and video imagery are enabled by the presence of audio controllers 44 and video controllers or translators 74. The audio controllers 44 control the audio portion of any broadcast, narrowcast or other display and typically include suitable audio amplifiers as well as gain controls and the like. The audio controllers 44 are connected to the various speakers such as the speakers 34. The video controller or translator likewise controls the imagery portion of any broadcast, narrowcast or other display in the digital display as well as on the digital display screen of the touch screen display. Also present are one or more input devices 114 and printers 112 as well as an integrated media dispensing system 116, the latter of which is discussed in detail below. Each of these components and their interconnections are more clearly presented in FIGS. 6 thru 8.

Figure 6:
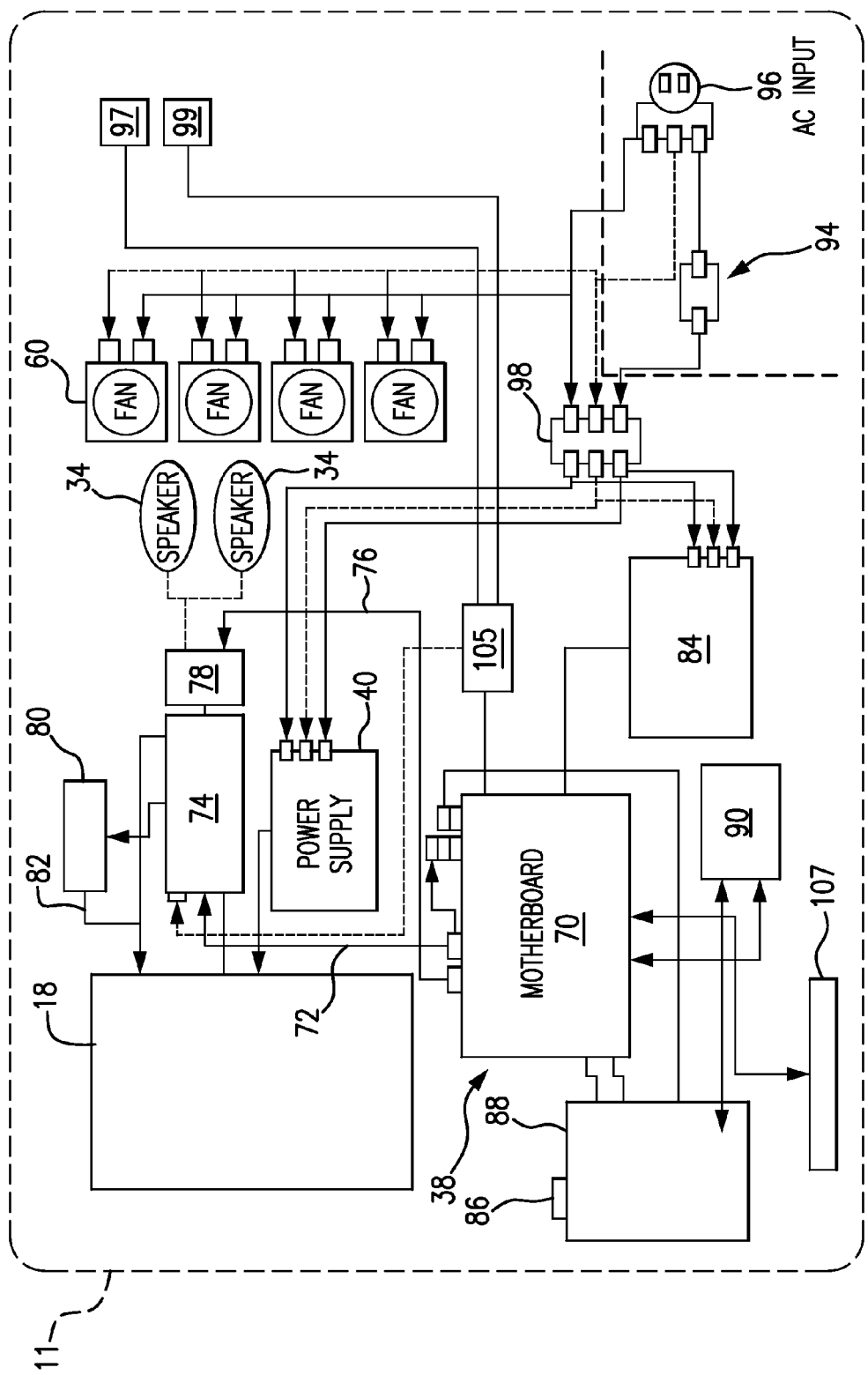
FIG. 6 is a schematic representation of exemplary components and their interconnectivity of one embodiment of the digital display of an interactive system.

FIG. 6 depicts the components and circuitry associated with the digital display system 11 and its operation and function; however, it is to be appreciated that this same circuitry could also be used for the whole of the interactive system by simply adding a touch screen display and, optionally, one or more accessories such as a printer or media dispenser. As indicated, the core element of the digital display is the processor 38 containing a motherboard 70. The motherboard may effectively provide a video output, in the form of a VGA or similar output signal 72, to a video translator 74 which, in turn provides and drives the display to the digital display 18.

The motherboard 70 may also provide an audio output 76 introduced into an audio control board 78. Thus, the motherboard may essentially provide both the video and the audio outputs which are used in the digital display screen 18. The audio board may be connected to the video translator 74 in the manner as shown in FIG. 6. Moreover, the video translator may provide an output to a daughterboard 80 which, in turn, may be provided with the audio and video inputs, the output of which is combined at 82 and passed on to the digital display screen 18. Where the speakers are not integrated into the digital display 18, or if supplemental speakers are employed, audio is also provided to such supplemental speakers 34 directly from the audio controller. Power is supplied to the processor 38 and motherboard 70 from an AC input 96 which completes a circuit with relay 98 through power switch 94. When the circuit is complete, power from the power source 96 passes through the relay 98 to the processor power supply 84 and then to the processor 38 and motherboard 70, as well as other cards and boards such as the video translator 74.

Information, data, and commands can be presented, sent to or downloaded by the processor 38 by a number of avenues including through an RJ-45 and/or an Ethernet or RJ-11 connectors, 97,98 which are connected to a UART and/or modem 105 which in turn is connected to the motherboard. The UART/modem could also be connected to the processor control board/CPU 88. Alternatively, communication to and from the interactive system may be via a wireless card or adapter 90, likewise connected to the motherboard 70 and/or the processor control board 88. For direct downloads from portable media such as flash drives, floppy discs, CDs, DVDs, and the like, data can be provided via the appropriate reader device, if present in the interactive system, or via ports or jacks, especially USB ports, 86 on the processor control board/CPU 88 from external reader devices. In this way, should the interactive display not have internal playback devices such as a CD/DVD player, floppy disc player, or the like, the appropriate devices can be connected externally to the process control board/CPU and the content downloaded. Downloaded and preloaded programs and data, especially display content, is stored on and retrieved from a data storage device or hard drive 107.

Because of the concern for heat build up in the interactive system, especially with respect to the digital display, the system is also provided with a plurality of fans 60. The fans are preferably powered independent of the processor and digital display to ensure that the fans continue running even after the former components are turned off so as to allow sufficient cool down time.

Figure 7:
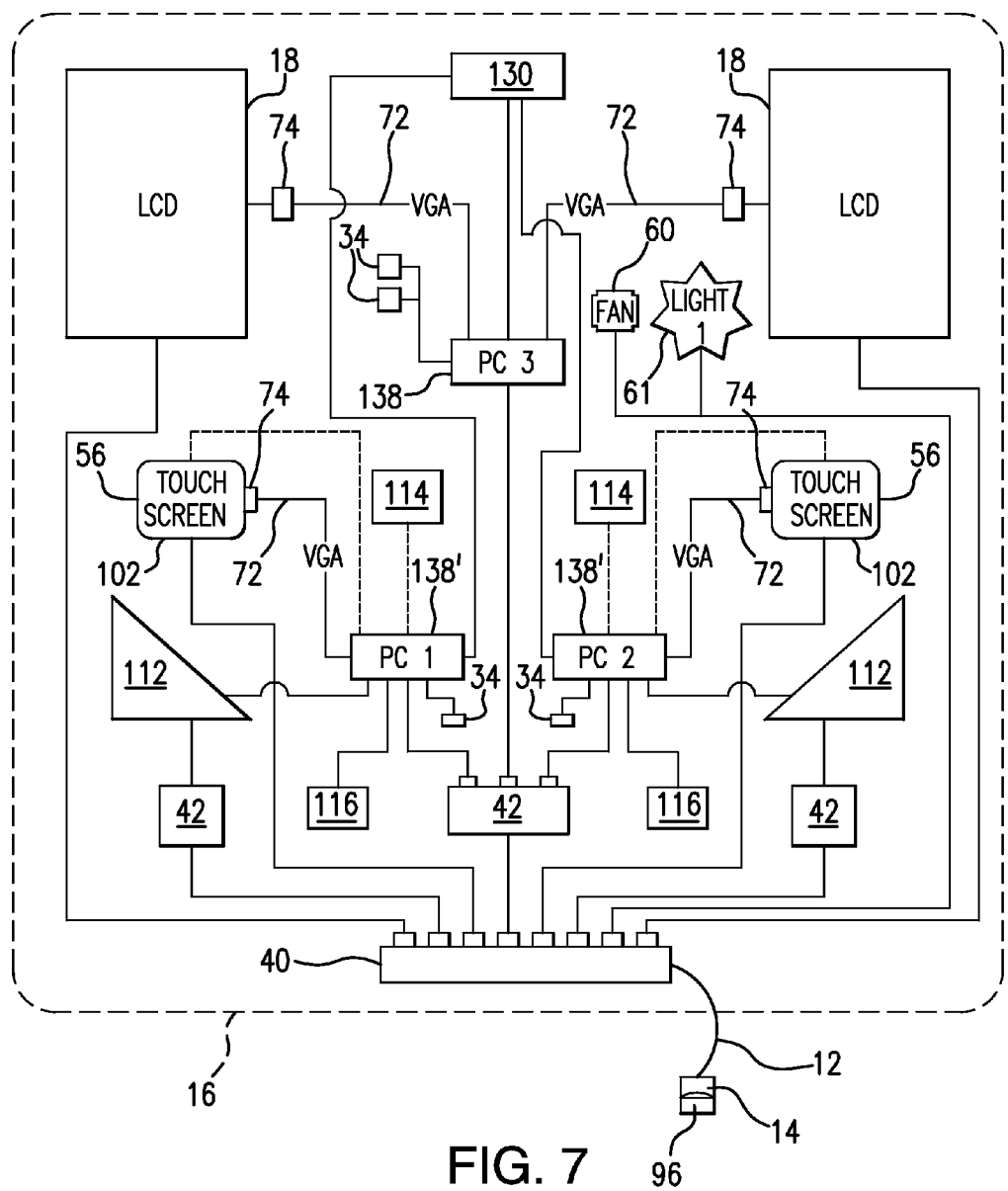
FIG. 7 is a schematic representation of exemplary components and their interconnectivity of one embodiment of an interactive system.

FIG. 7 presents the schematic diagram of a portable interactive system 16 comprising two digital displays 18 and two touch screen displays 56. The two digital displays 18 are controlled by a common processor, a computer, preferably a notebook type computer, 138 whereas the two touch screen displays are each controlled by an independent processor, again a computer, preferably a notebook type computer, 138'. The computers 138 and 138' comprise their respective motherboards, memory, RAM, etc. (as well as controllers and daughter boards, if present), and can be directly interconnected, i.e., hardwired to one another, or can be interconnected through a network hub 130, as shown. The network hub 130 may also have associated therewith or integrated therein a modem for Ethernet, coaxial cable, or telephone connection and/or a wireless card or adapter for accepting or connecting to wireless transmissions, including, via an appropriate receiver (not shown), satellite transmissions. As in the system of FIG. 6, processor 138 for the digital displays provides digital content or signal 72 to the video controller or translator 74 which in turn provides and drives the digital displays 18. Similarly, audio is provided through speakers 34, also connected to the computer 138.

As shown, the two touch screen display subsystems are identical in make-up, each comprising a processor or computer 138', a touch screen display 56, a speaker 34, a video controller or translator 74, a printing device 112, an input device 114 and a digital media dispensing system 116. Each of these elements has been discussed at length above; though further discussion of the media dispensing system 116 will be further described below.

The interactive system is power by and external power source 96 via connector 14 and power cord 12 to a main power supply 40. As shown, this particular system employs a plurality of secondary power supplies 42, one powering the three processors 138,138', and one supplying each printing device 112. Each of the digital displays 18 and touch screen displays 56 as well as the fans 60 and an internal light 61 are all directly powered from the main power supply 40.

Although touched upon above, it is to be appreciated that each of the interactive systems has a portal or entry (not shown) so that one can access the internal elements and components. Depending upon the size of the housing and the overall interactive system, the portal may be a panel that is removed or opened to provide access. On the other hand, large housings may warrant a door through which a service person or administrator can enter the inside of the interactive system so as to gain full access to the system, its components and circuitry.

Figure 8:
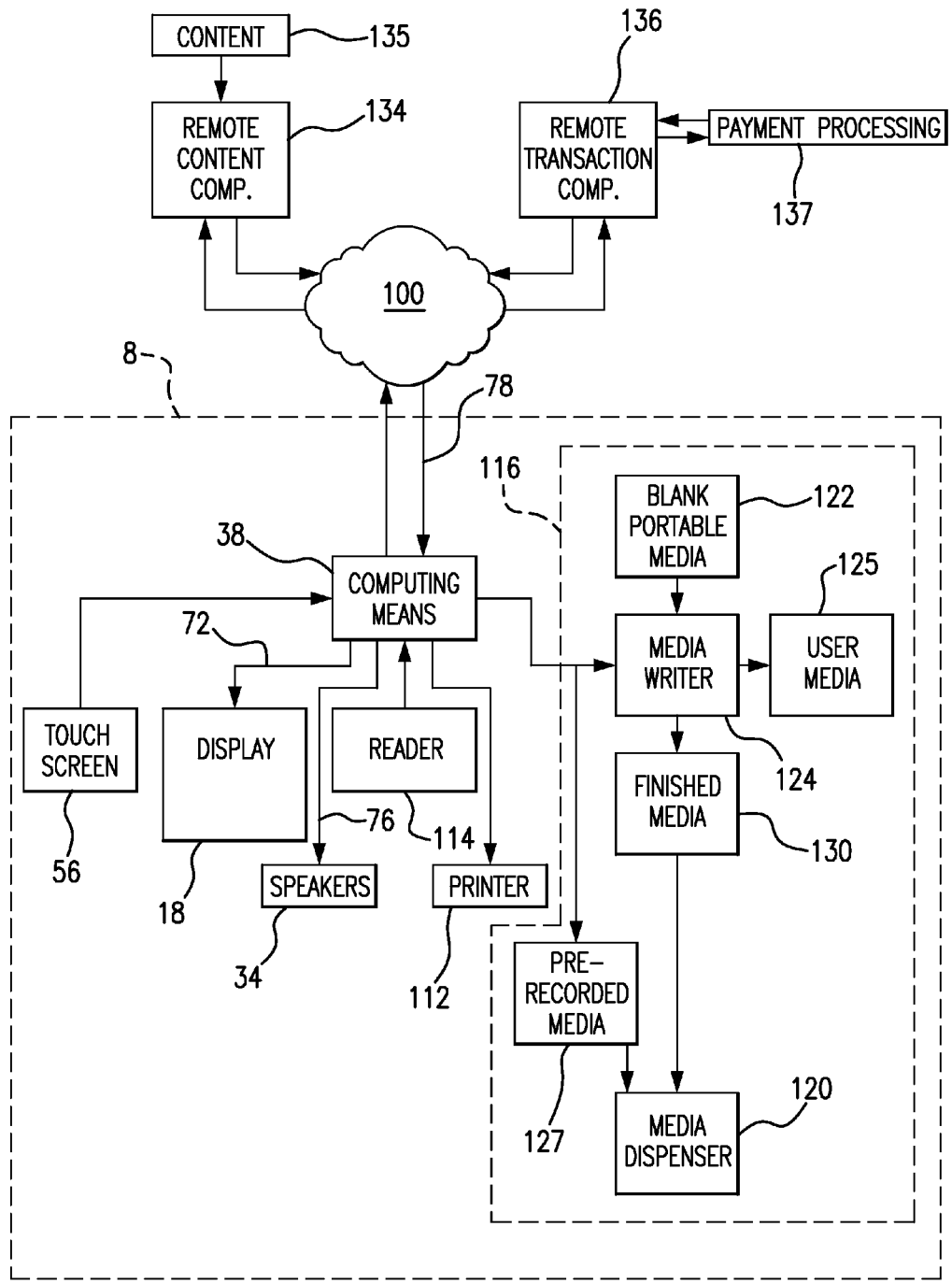
FIG. 8 is a schematic representation of exemplary content and information routing capabilities of the display system.

FIG. 8 depicts an interactive system 8 as part of an overall marketing and transactional process and system. Here the interactive system 8 is capable of having content installed and/or updated from a remote source, typically a remote content computer, 134 via wireless or wired transmissions, narrowcasting, or broadcasts 100. Preferably, the transmission or connection for the data transfer is over the Internet; though any of the know communications channels could also be employed, e.g., radio wave, IR, satellite, cable, telephone, etc. As depicted, the content to be downloaded is developed by or for the remote source by a content provider 135 and delivered to the interactive system by the remote source 134. Content download and/or update may be continuous or intermittent depending upon the nature and demands of the business. Furthermore, such updates may be automatic or otherwise and will include commands whereby the processor will modify the visual displays based on the content sent to the processor by a remote source. The new content could include, but is not limited to, new display content or updated display content, which may be digital, to show on the display screens or print to printable documents and/or coupons available for retrieval by a user. The new content could also include updated software and/or firmware for the internal computing components, updated user profiles, updated database information, and updated files available for recordation on a unit of portable media, whether blank media 122 stored within the digital media dispensing system 116 or user supplied. In the latter case, the user supplied media will be connected or inserted into the user media interface 125. Any media containing or not containing data may be considered blank portable media as long as the media is capable of receiving and storing, for later retrieval, the electronic content provided by the display system.

Additionally, the interactive system allows for and can benefit from a two-way communication and download with the remote source 134, either through the same communication channel 100 used to download content to the interactive display or through other communications, particularly digital communications, channels, especially the internet. For example, the interactive system can record and track data pertaining to the content displayed as well as the user interactions on the touch screen displays, particularly as they relate and correspond in time to the content being displayed on the digital display. Such collected data could include user requests and information, the number of users passing by the display system, the number of users using the display system, the number of goods sold and/or picked up from the shelving on the interactive systems, or other status and feedback of the various accessories integrated with the interactive system. All of this information is important not just for aiding the producer of the product or service offered on the interactive system but also for the remote source for determining pricing for use of the interactive system.

Also as shown in FIG. 8, the interactive system 8 also enables and facilitates commercial transactions through the communications channel 100. As indicated a remote transaction computer 136 could be operably connected to the display system through a communications channel 100, most likely the internet. When a user commences a transaction at the display system, transaction details, such as purchase price and payment method, could be transmitted to the remote transaction computer 136 for processing. On-line payment is then conducted through a payment processing site or program 137. Upon a successful processing of payment, the remote transaction computer 136 could transmit a signal to the display system, allowing the display system to dispense the requested content. The requested content can be dispensed through the various display screens or accessories, including the printing device 112 and/or the media dispensing system 116.

The interactive system 8 of FIG. 8 is representative of a simple system for brevity, particularly inasmuch as the focus or this figure are the two types of interactions contemplated thereby, as noted above. Here, the interactive system includes the processor, a computing means, 38, a digital display 18, a touch screen display 56 and speakers. The remaining three elements, the input device 114, the printing device 112 and the media dispensing system 116 all relate to the process of conducting and finalizing a commercial transaction on the interactive system.

As discussed above, the input device is preferably a card reader, though it could also be a bar code scanner, optical disk drive, or an RFID reader. This allows the user to conduct credit card and debit card transactions, to redeem coupons and gift cards, and the like. Additionally, because such articles oftentimes contain personal information such as one's identity and address, the inputted data can automatically populate the appropriate fields in any order forms or transactional forms or records required to complete the transaction.

Printing device 112 is also an important element for commercial transactions as the product or subject of that transaction may be a printed product and/or a printed receipt or confirmation may be desired for the transaction. The printer device may be any type of printer, thermal, inkjet, laser, etc so long as it provides the desired output. The printer device will include or have associated with it a storage or receptacle for print media, i.e., paper stock, ticket stock, etc. depending upon what is to be dispensed. These stock materials may be completely blank or partially so. For example, if the interactive system were to be used as a travel kiosk for making reservations on airlines, with hotels, etc., plain blank paper would be suitable as it could custom print each provider's letterhead and the reservation confirmation information. On the other hand, if the interactive system were dedicated to print tickets, especially for a transit system, a specific arena or venue, then the ticket could be partially pre-printed with only information relating to the specific event applicable to the user printed by the printer device, e.g., event, date of event, seat and row number.

Perhaps the most inventive aspect of the interactive system depicted in FIG. 8 is the media dispensing system 116 which enables the interactive system to dispense product in the form of electronic/digital content or media, which may either be pre-recorded or custom recorded. In one respect, the interactive system 8 may have a supply of prerecorded media 127 corresponding to the content being displayed on the digital display. For example, the display could be promoting one or several new music albums and/or music videos. The supply would include one or several forms of each specific product being promoted. For example, a given album could be available as a CD, DVD, domino, flash stick, etc. In the course of purchasing the product, the purchaser could specify both the product and form of product they desire. Upon completion of the purchase, the interactive display would move the purchased item from the supply to the media dispenser 120 to be retrieved by the purchaser.

The interactive system 8 of FIG. 8 also allows for the creation, including custom creation, of content on various media. Here, the media dispensing system includes a media writer 124 which can be any device capable of writing to, and preferably reading from, a piece of media, including but not limited to, a CD writer drive, a DVD writer drive, an RFID encoder, and/or a USB slot for reading and writing to a unit of USB enabled media. The media writer may also have associated therewith or integrated therein a media writer storage (not shown) which contains content to be written: this content may be in the form of computer data files, DVD video files, CD audio files, or other electronic files. The content may have been pre-loaded to the media writer storage or the system may allow for download and storage of content from external media, especially from the remote source 134. In this regard, when a purchase of a specific content is made, the processor 38 may contact the remote source to download the content being purchased and direct that content to the media writer for writing to the defined or selected media. Preferably, though, it is contemplated that the content so downloaded will be stored in the media writer storage so that it is readily available for a subsequent purchase of the same content. In this regard, the first time new content is downloaded, it is first stored in the media writer storage and then copied or written to the media being purchased. That content then remains in the media writer storage until intentionally removed or a predefined period of non-access to that media has passed.

One mode of operation of the media dispensing system 116 is where the purchaser has their own digital media or personal electronic device to which they desire to download the content to. When the purchaser supplied media is a CD, DVD, or other like writable media, then the media is place in or inserted into the media writer 124 and the media writer allowed to write the content to media. On the other hand, where the media is on an electronic storage type media or a personal electronic device, such as an MP3 player, iPod, iPhone, cell phone, Blackberry, flash drive, etc., the purchaser would merely connect the same to the appropriate port or jack in a user media interface 125. In either instance, when the commercial transaction is completed, the processor 38 would instruct the media writer to so write the content to the media. Alternatively, if the content is stored elsewhere in the interactive system, e.g., in the processor memory or storage, it will also send the content to the media writer. In either event, once the content is written to the purchaser supplied media, the media is merely retrieved from the writer or disconnected from the user media interface.

An alternate mode of operation is that wherein the media dispensing system 116 is configured to create and dispense the media desired by the purchaser. Here, instead of storing and dispensing prepared media 130 or outputting the content to the purchaser's media or personal electronic device, the media dispensing system 116 may contain a supply or storage of blank media. When initiated, the media writer 124 will receive the selected media from the blank media storage 122 and begin writing the selected content to the media. As noted above, the content may come from the media writer storage, from the storage or memory associated with the processor 38 or directly from a remote source. In any event, once the writing is completed, the finished media is transported 130 to the media dispenser outlet 120 for retrieval by the purchaser.

It is to be appreciated that the concept of writing of the content to a media article or device means moving the unit of media into a readable/writeable association with the media writer and outputting the content. Some types of media, such as flash drives, require direct electrical contact with the media writer in order to be in a readable/writeable association with the media writer. However, other types of media, such as RFID tags, may enter into a readable/writeable association with the media writer simply by being moved into close proximity of the media writer. This disclosure contemplates the use of all of these types of media and media writers.

Though not shown, it is also to be understood that a labeler could be associated with the media dispensing system 116. The labeler could be utilized such that it could label each piece of finished media 130 or blank media 122 based off of digital content stored in memory, for example, associated with the processor 38. The digital content for the labels could be updated in the same fashion as other content—via transmissions from the remote source. The labeler could print a label onto the piece of finished media 130 itself or onto an appliqué which would then be attached to the finished media 130, this method being effected through the use of a marking device, such as standard printer, like an inkjet printer, in conjunction with peelable sheet material, such as peelable CD label sheets, or other similar material. A labeler could also use some other marking device to label the finished media 130, such as a laser engraver which could be used to engrave a label into the side of a USB flash drive.

A portion of the display system as described above could be embodied in a replaceable installation. Such an installation would be installable at almost any site with minimal deployment costs. Additionally, such an installation could be easily swapped out in the event that the original replaceable installation is rendered partially or fully non-functional for some reason. For example, in an exemplary embodiment, the replaceable installation would be a free-standing kiosk provided with power and a wired or wireless communication connection, such as an Ethernet cable connecting the device to the Internet. In the event that the free-standing kiosk fails or is rendered non-functional in some respect, the kiosk could be swapped out with another kiosk that could be quickly and remotely programmed to resume the same tasks and displays as the first kiosk. In another exemplary embodiment, the replaceable installation would be digital monitor mounted to a wall, a stand, or another support structure and provided with power and a wired or wireless communication connection, such as an 802.11(g) or (n) wireless connection to a device providing a connection to the Internet. In the event that the digital monitor fails or is rendered non-functional in some respect, the digital monitor could be swapped out with another monitor that could be quickly and remotely programmed to resume the same tasks and displays as the first monitor. In such an embodiment, either the monitor itself could be replaced as a replaceable installation, or the monitor and the stand could be replaced together as a single replaceable installation.

It should be noted that communication connection, as used in this disclosure, may include any means of transmitting digital information, whether nearly-instantaneous, indefinitely-delayed, or anywhere in between. Some exemplary communication connections include Ethernet, wireless RF, flash drives, optical disks, magnetic disks, satellite, and other means of transmitting digital information from one processor to another processor. Furthermore, any references to communications being made through electrical signals may also be made through other comparable methods, including optical transmission.

It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the disclosure are deemed to be covered by the claims.

I claim:

1. An interactive media display comprising
   (a) at least one digital display panel,
   (b) at least one touch screen display panel,
   (c) at least one processor for controlling and operating the display panels and having or having associated therewith a memory for storing digital content to be presented on the at least one digital display panel as well as the data or content and operative functions of the touch screen display,
   (d) a housing in which or to which the at least one digital display and at least one touch screen display are seated or mounted and in which or near which the processor is located, and
   (e) a media dispensing system comprising:
      (i) a supply of prerecorded, prewritten, or preprinted products to be dispensed by the display and a transport system for moving said products from the supply to an accessible dispenser opening to be retrieved;
      (ii) (A) a user media interface whereby a user can connect or insert a media article or personal electronic device to which content is to be written to the user interface and (B) a media writer which is capable of writing the content to the user supplied media;
      (iii) (A) a supply of blank media accessible to a user and (B) a media writer capable of accepting the blank media and of writing the content to the blank media; and
      (iv) (A) a supply of blank media, (B) a transport mechanism by which the blank media is moved from the supply to a media writer, (C) a media writer capable of accepting the bland media and writing the content to that blank media, and (D) a transport means for removing the written media to an accessible opening to allow the retrieval of the media.

2. The interactive media display of claim 1 wherein there are at least two processors, one associated with the operation of the at least one digital display and one associated with the operation of the at least one touch screen display.

3. The interactive media display of claim 2 having a single processor associated with the digital display and a single processor associated with each touch screen display, the display having at least two touch screen displays.

4. The interactive media display of claim 1 wherein the housing is a wall wherein the display panels are embedded in or mounted to the wall and the processor is on a support on the opposite side of the wall.

5. The interactive media display of claim 1 wherein the housing is a kiosk or kiosk-type structure with the display panels embedded in or mounted to the exterior of the housing and the processor or processors are contained within the housing.

6. The interactive media display of claim 5 wherein the housing is portable.

7. The interactive media display of claim 1 further comprising one or more external communication means.

8. The interactive media display of claim 7 wherein the external communication means is a modem, UART, or wireless card.

9. The interactive media display of claim 1 further comprising a printing device associated with the processor for the touch screen display.

10. The interactive media display of claim 1 further comprising an input device selected from a card reader, an optical scanner, a bar code scanner and an RFID reader.

11. The interactive media display of claim 1 wherein the processor is preprogrammed to communicate with a remote source and to be responsive to the remote source, whereby the remote source can automatically download content, to the processor, its associated storage or memory, or both and update content already present on the processor or associated storage.

12. The interactive media display of claim 1 wherein the processor of the touch screen display is preprogrammed to enable communication with a remote processor to enable the completion of one or more transactions.

13. The interactive media display of claim 12 wherein the remote processor is capable of conducting a commercial transaction and the processor for the touch screen display is capable of either dispensing the product that is the subject of the transaction or of providing a receipt or confirmation of the transaction.

14. The interactive media display of claim 1 comprising multiple processors wherein each processor is, directly or indirectly, connected to the other whereby the content on the digital display is related to the transactions enabled by the touch screen displays.

15. A method of conducting commercial transactions wherein the method employs the
   interactive media display of claim 1 and the method comprises
      (i) displaying content regarding a product or service on the at least one digital display panel which content is originated from the initial remote source (B),
      (ii) enabling a commercial transaction on the touch screen display regarding the subject mater of the content displayed on the digital display, which transaction is completed through the second remote source (C), and
      (iii) dispensing the product or a receipt or confirmation regarding the product or service pertaining to the commercial transaction conducted through the touch screen display.

16. The method of claim 15 wherein the subject of the commercial transaction is digital content which is dispensed by the interactive media display.

17. The method of claim 15 wherein the interactive digital display is capable of writing digital content to a storage media or personal electronic device and the commercial transaction includes the writing of the digital content to the storage media or personal electronic device.

18. An interactive media display comprising:
(a) at least one digital display panel,
(b) at least one touch screen display panel,
(c) at least one processor for controlling and operating the display panels and having or having associated therewith a memory for storing digital content to be presented on the at least one digital display panel as well as the data or content and operative functions of the touch screen display,
(d) a housing in which or to which the at least one digital display and at least one touch screen display are seated or mounted and in which or near which the processor is located, and
(e) a media dispensing system comprising:
(a) a supply of prerecorded, prewritten, or preprinted products to be dispensed by the display and a transport system for moving said products from the supply to an accessible dispenser opening to be retrieved
(b) (i) a user media interface whereby a user can connect or insert a media article or personal electronic device to which content is to be written to the user interface and (ii) a media writer which is capable of writing the content to the user supplied media
(c) (i) a supply of blank media accessible to a user and (ii) a media writer capable of accepting the blank media and of writing the content to the blank media; or
(d) (i) a supply of blank media, (ii) a transport mechanism by which the blank media is moved from the supply to a media writer, (iii) a media writer capable of accepting the bland media and writing the content to that blank media, (iv) a transport means for removing the written media to an accessible opening to allow the retrieval of the media.

19. The interactive media display of claim 18 wherein the media dispensing system comprises (i) a supply of blank media, (ii) a transport mechanism by which the blank media is moved from the supply to a media writer, (iii) a media writer capable of accepting the bland media and writing the content to that blank media, and (iv) a transport means for removing the written media to an accessible opening to allow the retrieval of the media.

* * * * *